United States Patent
Noura et al.

(10) Patent No.: US 10,903,978 B2
(45) Date of Patent: Jan. 26, 2021

(54) METHOD OF ENCRYPTION WITH DYNAMIC DIFFUSION AND CONFUSION LAYERS

(71) Applicant: COMMISSARIAT A L'ENERGIE ATOMIQUE ET AUX ENERGIES ALTERNATIVES, Paris (FR)

(72) Inventors: Hassan Noura, Beirut (LB); Damien Courousse, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 440 days.

(21) Appl. No.: 15/532,358

(22) PCT Filed: Dec. 2, 2015

(86) PCT No.: PCT/EP2015/078372
§ 371 (c)(1),
(2) Date: Jun. 1, 2017

(87) PCT Pub. No.: WO2016/087520
PCT Pub. Date: Jun. 9, 2016

(65) Prior Publication Data
US 2017/0366339 A1    Dec. 21, 2017

(30) Foreign Application Priority Data
Dec. 4, 2014    (FR) ..................................... 14 61917

(51) Int. Cl.
H04L 9/06    (2006.01)
H04L 9/08    (2006.01)
(Continued)

(52) U.S. Cl.
CPC .............. H04L 9/0631 (2013.01); G09C 1/00 (2013.01); H04L 9/002 (2013.01); H04L 9/0618 (2013.01);
(Continued)

(58) Field of Classification Search
CPC ..... H04L 9/0631; H04L 9/002; H04L 9/0618; H04L 9/0869; H04L 9/14; H04L 9/04; H04L 63/0435; G09C 1/00
See application file for complete search history.

(56) References Cited

U.S. PATENT DOCUMENTS

2010/0303229 A1*  12/2010  Unruh .................. H04L 9/0637
                                                                    380/28

OTHER PUBLICATIONS

Bernstein (The Salsa20 family of stream ciphers, Dec. 25, 2007, 15 pages) (Year: 2007).*
(Continued)

Primary Examiner — Oleg Korsak
(74) Attorney, Agent, or Firm — Oblon, McClelland, Maier & Neustadt, L.L.P.

(57) ABSTRACT

A method of encrypting messages in clear with the aid of a secret key, the method of encryption implementing at least one substitution layer using a substitution table and a diffusion layer using a diffusion matrix, the substitution layer and/or the diffusion layer being configured in a dynamic manner by a control parameter obtained by combining the secret key with the output word from a counter and by performing a non-invertible transformation on the combination. The counter is incremented at least once between two successive plaintext messages. The configuration of the substitution layer is manifested by an identical permutation of bits of each element of the substitution table and the configuration of the diffusion layer is manifested by a permutation of the elements of the diffusion matrix.

16 Claims, 11 Drawing Sheets

(51) Int. Cl.
- *G09C 1/00* (2006.01)
- *H04L 9/00* (2006.01)
- *H04L 9/14* (2006.01)
- *H04L 29/06* (2006.01)

(52) U.S. Cl.
CPC .............. *H04L 9/0869* (2013.01); *H04L 9/14* (2013.01); *H04L 63/0435* (2013.01)

(56) References Cited

OTHER PUBLICATIONS

Substitution cipher from WikipediA, retrieved Sep. 30, 2019, 6 pages.*

Patent Eligible Subject Matter: Report on Views and Recommendations From the Public, USPTO, Jul. 2017 (Year: 2017).*

International Search Report dated Mar. 2, 2016, in PCT/EP2015/078372, filed Dec. 2, 2015.

French Search Report dated Oct. 13, 2015, in French Patent Application No. 1461917, filed Dec. 4, 2014.

Paar et al., "Understanding Cryptography", Springer, 2010, 382 pages.

Krishnamurthy et al., "Blow-Cast-Fish: A New 64-bit Block Cipher", IJCSNS International Journal of Computer Science and Network Security, vol. 8, No. 4, Apr. 2008, p. 282-290, XP 055219160.

"GlobalPlatform Card Specification", Version 2.2, Mar. 2006, 374 pages, XP 055157760.

Stoianov et al., "A new approach of generating key-dependent S-BOXes in AES", Jornadas de Criptografia/ Spanish Cryptography Days (SCD 2011), Nov. 18, 2011, 16 pages, XP 055220166.

Orhanou et al., "Snow 3G Stream Cipher Operation and Complexity Study", Contemporary Engineering Sciences, vol. 3, No. 3, 2010, p. 97-111, XP 055220190.

* cited by examiner

METHOD OF ENCRYPTION WITH DYNAMIC DIFFUSION AND CONFUSION LAYERS

TECHNICAL FIELD

The present invention relates to the field of cryptography and more particularly the field of symmetrical cryptography.

A symmetrical encryption method is based on the sharing of a secret key (or symmetrical key) between a sender (conventionally called Alice) and a receiver (conventionally called Bob). This secret key is supposed to have been shared between Alice and Bob by means of a secure channel. According to this encryption method, Alice encrypts a plaintext message b by means of the secret key k, and transmits the method thus encrypted, c, over a non-secure transmission channel to Bob. The latter deciphers the encrypted message in order to find the original message.

The encryption operation can thus be considered to be an application g: K×B→C where K,B,C represent respectively the space of the secret keys, the space of the plaintext messages and the space of the encrypted messages. Encryption by a key k∈K is represented by the function $g_k$: B→C such that $g_k(b)=g(k,b)=c$.

The encryption function must be resistant to cryptanalysis, that is to say to all techniques making it possible to discover the plaintext message from the encrypted message or to discover the secret key from the encrypted message. It is important to note that this resistance must be guaranteed even though an eavesdropper knows all the details of the encryption function apart from the secret key itself (the so-called Kerckhoff principle).

In order to obtain strong encryption functions within the above meaning, it has been shown by Claude Shannon that they should comprise elementary (or primitive) confusion and diffusion operations.

Confusion is an encryption operation for masking the relationship between the key and encrypted message. In modern encryption methods, confusion is generally performed by means of a substitution operation, as described later.

Diffusion is an operation by means of which the influence of a symbol of the plaintext message is spread over a large number of symbols of the encrypted message.

In other words, if only one bit of a symbol of the plaintext message is modified, a large number of symbols (typically half) in the encrypted message are modified accordingly (a property known by the term avalanche effect). The diffusion operation masks the statistical properties of the plaintext message from any eavesdropper.

The two best known symmetrical encryption methods are the DES (Data Encryption Standard) method and AES (Advanced Encryption Standard) method.

The DES encryption method is based on a Feistel network structure as shown in FIG. 1.

The plaintext message, b, consists of a word of N=64 bits. It is first of all subjected to a permutation of its bits, denoted IP.

The message resulting from the permutation, IP(b), is next subjected to a Feistel network consisting of 16 successive iterations (or rounds), $120_1, \ldots, 120_{16}$, with identical structures.

At each iteration i, the message is divided into two parts of N/2 bits, denoted respectively $L_{i-1}$ (left-hand part) and $R_{i-1}$ (right-hand part).

The right-hand part, $R_{i-1}$, is subject to a non-linear function, $f$, parameterised by a sub-key (or round key) $k_i$. The result obtained, $f(R_{i-1},k_i)$ is combined with the left-hand part $L_{i-1}$, by means of an exclusive OR operation (hereinafter denoted ⊕). The left-hand and right-hand parts are next inverted in order to form the input message of the following iteration. In other words:

$$L_i=R_{i-1} \quad (1\text{-}1)$$

$$R_i=L_{i-1} \oplus f(R_{i-1},k_i) \quad (1\text{-}2)$$

The function $f$ uses a plurality of substitution tables or S-boxes, as well as permutation. The function $f$ fulfils both a substitution role and a diffusion role. It should be noted that the sub-key $k_i$ acts only in the form of an addition to an intermediate result (expansion E on the figure).

At the end of the $16^{th}$ iteration, the message is subjected to the permutation $IP^{-1}$ that is the inverse of the initial permutation, in order to provide the encrypted message $c=IP^{-1}(L_{16}R_{16})$.

The sub-keys $k_i$ of the various iterations are generated from the secret key k, of size N=64 bits. First of all, the key k has all its bits having a position that is a multiple of 8 removed and is permutated by means of a permutation PC−1 on the remaining 56 bits. At each iteration, the key is divided into a left-hand part and a right-hand part, of 28 bits, each of these parts undergoing a rotation by a number of bits dependent on the index i of the iteration in question.

The AES encryption method is based on a substitution-permutation network or SPN network, as shown in FIG. 2.

After addition of the plaintext message, b, with an initial sub-key, $k_0$, at 210, the message obtained is subjected to a sequence of iterations (also referred to as "rounds") with identical structures.

Each iteration $220_i$ comprises a substitution layer (byte substitution layer), $221_i$, a diffusion layer, $222_i$, and an addition layer, $223_i$, with a sub-key of the iteration in question, derived from the secret key k.

The plaintext message, b, consists of 16 bytes $A_0, \ldots, A_{15}$.

The substitution layer $221_i$, substitutes, for each byte $A_m$, a byte $B_m$ by means of a substitution table (S-box), the 16 substitution tables having identical compositions.

The bytes $B_0, \ldots, B_{15}$ thus obtained are stored in a 4×4 matrix. They are the subject of a permutation operation on the rows (ShiftRows sublayer), and then a mixing operation on the columns (MixColumn sublayer) performing the diffusion. Each column of the matrix is multiplied by a constant matrix, referred to as a diffusion matrix, of size 4×4, the operations of multiplication of the various elements being performed in $GF(2^8)$.

The diffusion layer serves to propagate the change to the other columns and consequently makes it possible to provide the aforementioned avalanche effect after a few iterations.

It will be noted that the last iteration, $220_{Nr}$, does not comprise a mixing on the columns (MixColumn sublayer).

The secret key of the AES encryption method may be of size 128, 192 or 256 bits. The process of generating the sub-keys depends on the size of the key but in all cases uses operations of rotation by bytes, of substitution by means of S-boxes and of adding.

A description of the DES and AES encryption methods can for example be found in the work by Christof Paar and Jan Pelzl entitled "Understanding Cryptography", published by Springer.

In general terms, symmetrical encryption methods can be represented by a sequence of encryption rounds, each encryption round comprising a substitution operation and a diffusion operation.

The substitution operation is a non-linear transformation generally performed by means of S-boxes.

The diffusion operation is generally effected by a linear transformation, in particular by a multiplication by means of a matrix with coefficients in $GF(2^8)$.

FIG. 3 shows schematically the general structure of an encryption method known from the prior art.

It uses a secret key k to encrypt a plaintext message, b.

The secret key k serves to generate a sequence of sub-keys, $k_i$, i=1, . . . , $N_r$, each sub-key being used by a corresponding encryption round. More precisely, each encryption round comprises an operation of addition with a round sub-key, $321_i$, and of substitution, $322_i$, and a diffusion step, $323_i$.

Symmetrical encryption methods are resistant to conventional cryptanalysis methods (analytical attacks, brute-force attacks) but the encryption circuits that implement them are on the other hand substantially more vulnerable to physical attacks such as fault attacks, FA, or side channel attacks, SCA. In general terms, SCA attacks use physical measurements of the encryption circuit (power consumption, electromagnetic radiations, rhythm of the computations, etc.) whereas FA attacks exploit logic errors caused by the interceptor in order to find the secret key.

In order to protect against physical attacks, various countermeasures have been developed, in particular so-called masking techniques. These techniques aim more particularly to make a statistical analysis of the physical measurements fail by randomising the execution of certain computations by means of random numbers. More precisely, masking consists of mixing random values (masks) with the intermediate values when the various encryption steps are embarked on and performing a reverse operation at the end of these steps. This masking technique is however particularly complex because of the non-linear character of certain encryption steps, the reverse operation then requiring significant computing resources.

The aim of the present invention is to propose a symmetrical encryption method that is substantially more robust to physical attacks, simple to implement and requiring fewer computing resources than the aforementioned masking technique, without exhibiting increased vulnerability to conventional cryptanalysis techniques.

DISCLOSURE OF THE INVENTION

The present invention is defined by a method for the symmetrical encryption of plaintext messages by means of a secret key, the encryption method implementing at least one substitution layer using a substitution table and a diffusion layer using a diffusion matrix, in which:
- a counter is initialised by means of a seed and said counter is incremented at least once between the encryption of two successive plaintext messages;
- a non-invertible transformation is performed on a combination of said secret key with an output word from said counter in order to generate a control parameter;
- the substitution layer and/or the diffusion layer is configured by means of the control parameter, the configuration of the substitution layer being manifested by an identical permutation of the bits of each element of the substitution table and the configuration of the diffusion layer being manifested by a permutation of the elements of the diffusion matrix.

According to a first embodiment, the encryption method performs a block encryption, each block being subject to a plurality $N_r$ of encryption rounds, each encryption round comprising a substitution layer and a diffusion layer, the substitution layer and the diffusion layer of each encryption round being controlled by means of the control parameter.

Preferably, a first part and a second part of the corresponding control parameter are extracted and the substitution layer and the diffusion layer are configured respectively by means of the first part and the second part thus extracted.

From said first part of the control parameter, it is possible to generate a first permutation vector and the bits of each element of a static substitution table are permutated, by means of said first permutation vector, in order to generate a dynamic substitution table, dependent on said control parameter.

The first permutation vector is advantageously generated by dividing the first part of the control parameter into a plurality of blocks, each block being stored in a control register, and by performing a plurality of permutation steps, each permutation step comprising control of an input data register by a control register in order to store elements of an input data register in an output data register, said control consisting of storing elements of the input data register at a first end of the output data register if the bits corresponding to these elements in the control register have a first logic value, and storing these same elements at a second end of the output data register if the bits corresponding to the same elements in the control register have a second logic value.

It is possible to generate, from the second part of the control parameter, a second row permutation vector and a second column permutation vector, and the rows and columns of a predetermined diffusion matrix are permutated respectively according to said second row and column permutation vectors, in order to generate a dynamic diffusion matrix dependent on said control parameter.

In this case, the second row and column permutation vectors can be respectively generated by dividing the second part of the control parameter into first and second words with the same size, the first and second words being each divided into a plurality of blocks.

Advantageously, each block of the first and respectively second row is stored in a control register, and a plurality of permutation steps are performed, each permutation step comprising control of an input data register, by a control register for storing elements of an input data register in an output data register, said control consisting of storing elements of the input data register at a first end of the output data register if the bits corresponding to these elements in the control register have a first logic value, and storing these same elements at a second end of the output data register if the bits corresponding to these same elements in the control register have a second logic value.

According to a first variant, the counter is incremented every $Q_r=wN_r$ encryption rounds, where w is the number of blocks in the plaintext message.

According to second variant, the counter is incremented every $Q_r<N_r$ encryption rounds and $Q_r,N_r$ are integers prime with each other.

Advantageously, the combination of the secret key with the output word of the counter is a concatenation.

The non-invertible transformation advantageously comprises a hash operation.

According to a second embodiment, the encryption method performs a stream encryption, each bit of the plaintext message being added to a corresponding bit of a keystream, the keystream being generated by means of a shift register coupled to a finite state machine, the finite state machine comprising at least one substitution layer using a substitution table and a diffusion layer using a diffusion matrix, the substitution layer and/or the diffusion layer being controlled by means of a corresponding control parameter, the configuration of the substitution layer being manifested by an identical permutation of the bits of each element of the substitution table and the configuration of the diffusion layer being manifested by a permutation of the elements of the diffusion matrix.

The present invention also relates to a computer program which, when it is executed by a computer, performs the steps of the symmetrical encryption method defined above. The present invention likewise relates to a computer medium in which the symmetrical encryption program in question is stored.

Finally, the present invention relates to a method for the decryption of a message encrypted by means of the symmetrical encryption method according the first embodiment, said decryption method implementing at least one second substitution layer using a second substitution table and a second diffusion layer using a second diffusion matrix, and comprising the following steps:

a second counter is initialised by means of the same seed as the one used at encryption and said counter is incremented using the same initial value and the same frequency as the one used for encryption;

the same non-invertible transformation is performed on the same combination of the secret key used for the encryption with the output word of said counter;

the same control parameter of the encryption is generated from the result obtained by said non-invertible transformation;

the second substitution layer and/or the second diffusion layer is/are configured by means of the corresponding control parameter, the configuration of the second substation layer being manifested by an inverse permutation of the bits of each element of the second substitution table with respect to the permutation used for the encryption, and the configuration of the second diffusion layer being manifested by an inverse permutation of the elements of the diffusion layer with respect to the permutation used for encryption.

In a similar manner, the present invention finally relates to a method for the decryption of a message encrypted by means of the symmetrical encryption method according the second embodiment, each bit of the encrypted message being added to a corresponding bit of the same keystream as the one generated during encryption, the keystream being generated by means of a second shift register coupled to a second finite state machine, the second finite state machine comprising at least one second substitution layer using the same substitution table as the one used for encryption and a diffusion layer using the same diffusion matrix as the one used for encryption, each substitution layer and/or each diffusion layer being controlled by means of a corresponding control parameter, the configuration of the substitution layer being manifested by a permutation of the bits of each element of the substitution table identical to the one used during encryption and the configuration of the diffusion layer being manifested by a permutation of the elements of the diffusion matrix identical to the one used during encryption.

BRIEF DESCRIPTION OF THE DRAWINGS

Other features and advantages of the invention will emerge from a reading of a preferential embodiment of the invention with reference to the accompanying figures, among which:

FIG. 7A shows an example of a static substitution table in FIG. 6;

FIG. 7B shows the substitution table of FIG. 7A after a permutation operation of FIG. 6;

DETAILED DISCLOSURE OF PARTICULAR EMBODIMENTS

We will consider hereinafter a symmetrical encryption method comprising a plurality of rounds, each round comprising an addition layer, a substitution layer and a diffusion layer within the previously defined meaning.

A first principle at the basis of the invention is the make the dynamic substitution and/or diffusion layers according to a pseudorandom process. A second principle at the basis of the invention is to preserve the cryptographic properties of these layers using substitution tables and diffusion matrices that are globally invariant within the meaning described below.

Figure 1:
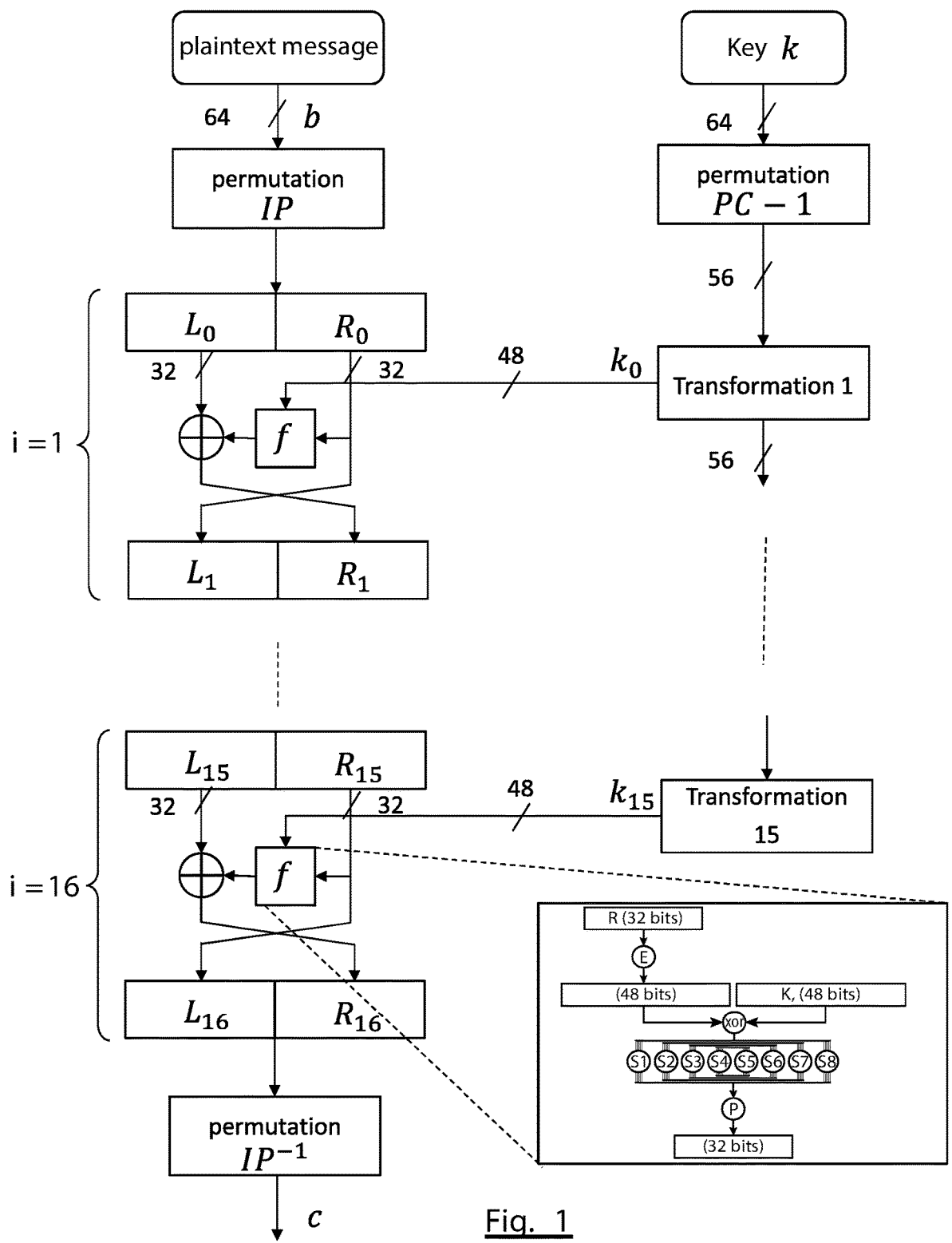
FIG. 1 shows schematically a DES encryption method known from the prior art.
Figure 2:
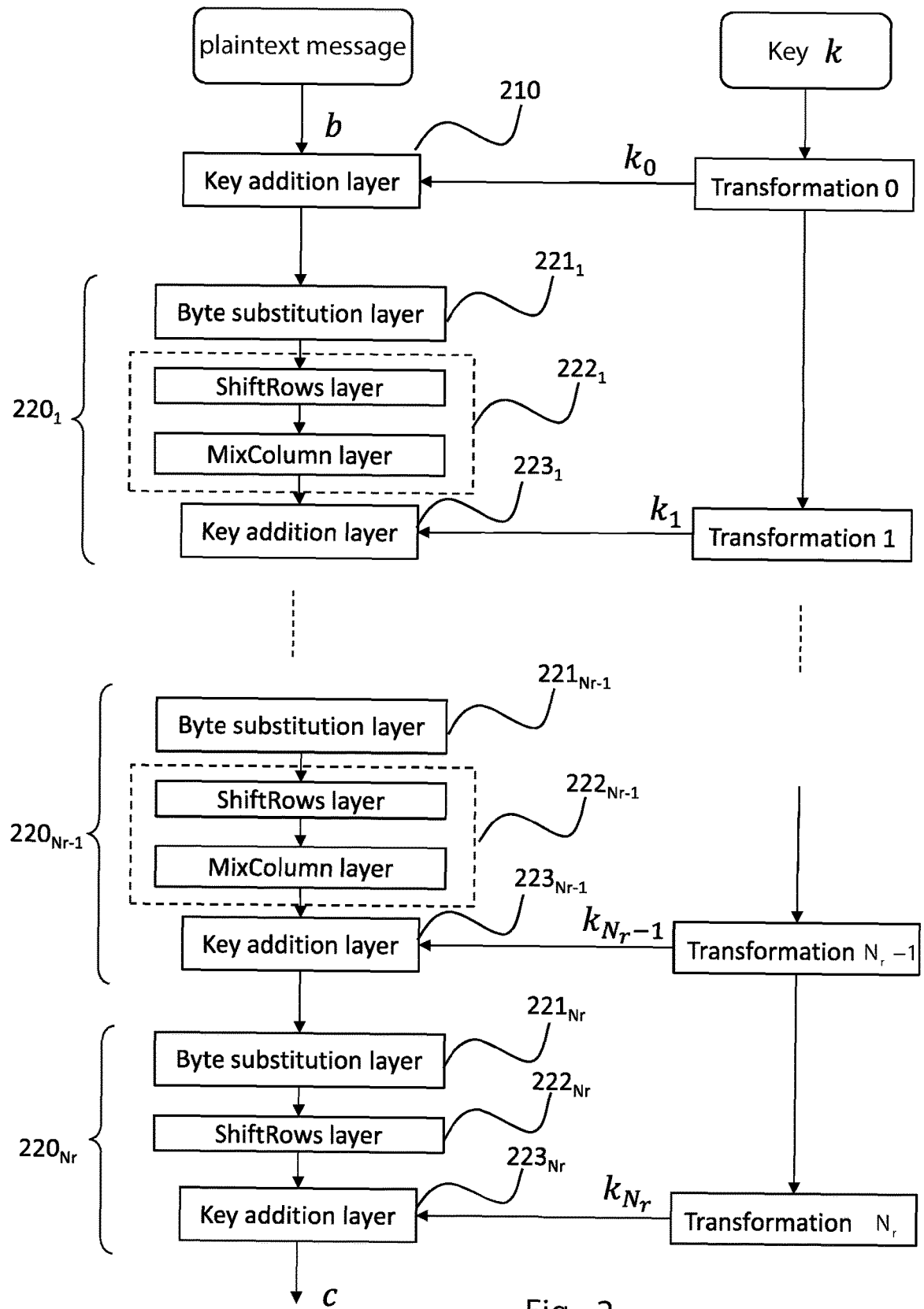
FIG. 2 shows schematically an AES encryption method known from the prior art.
Figure 3:
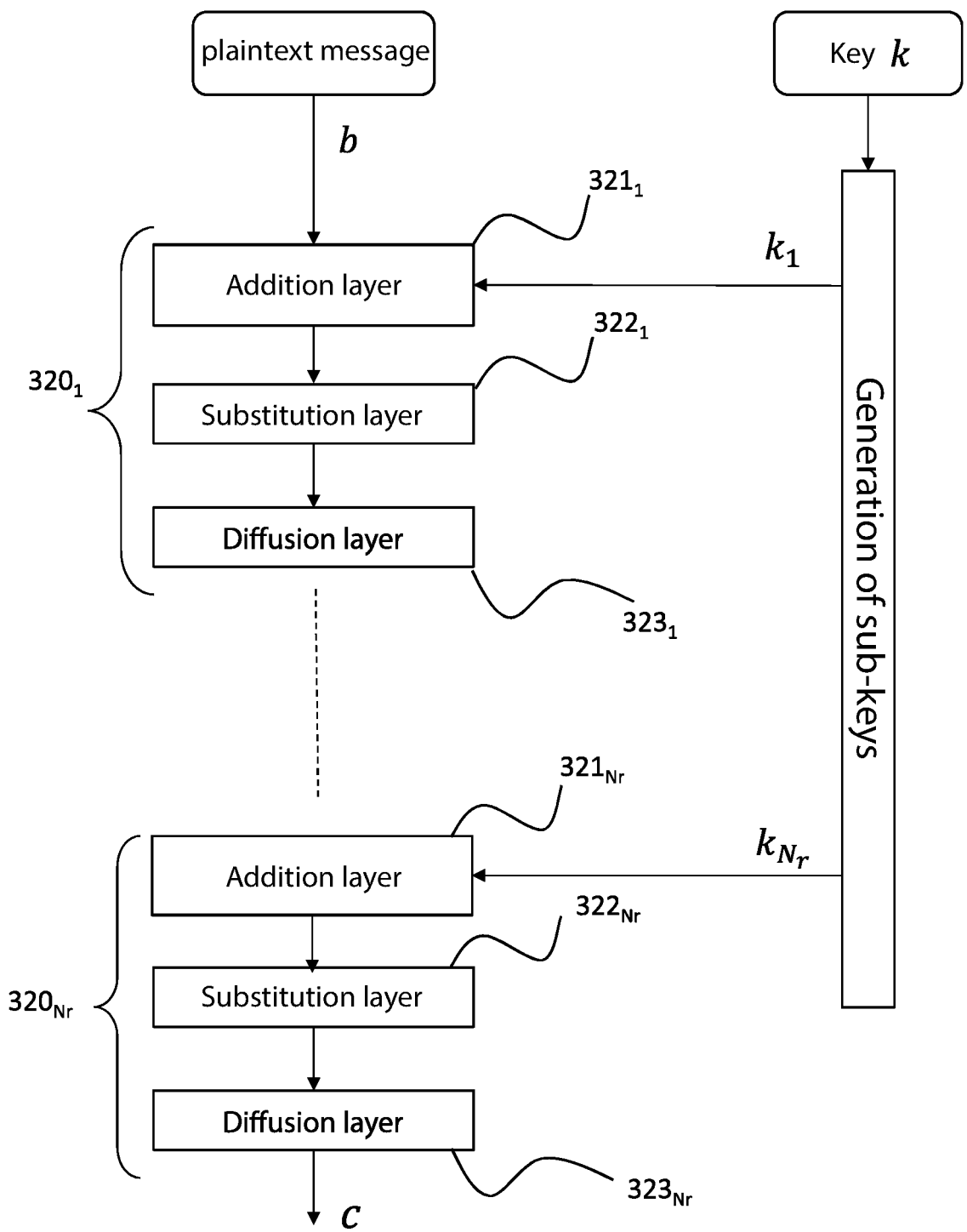
FIG. 3 shows schematically the general structure of a symmetrical encryption method known from the prior art.
Figure 4:
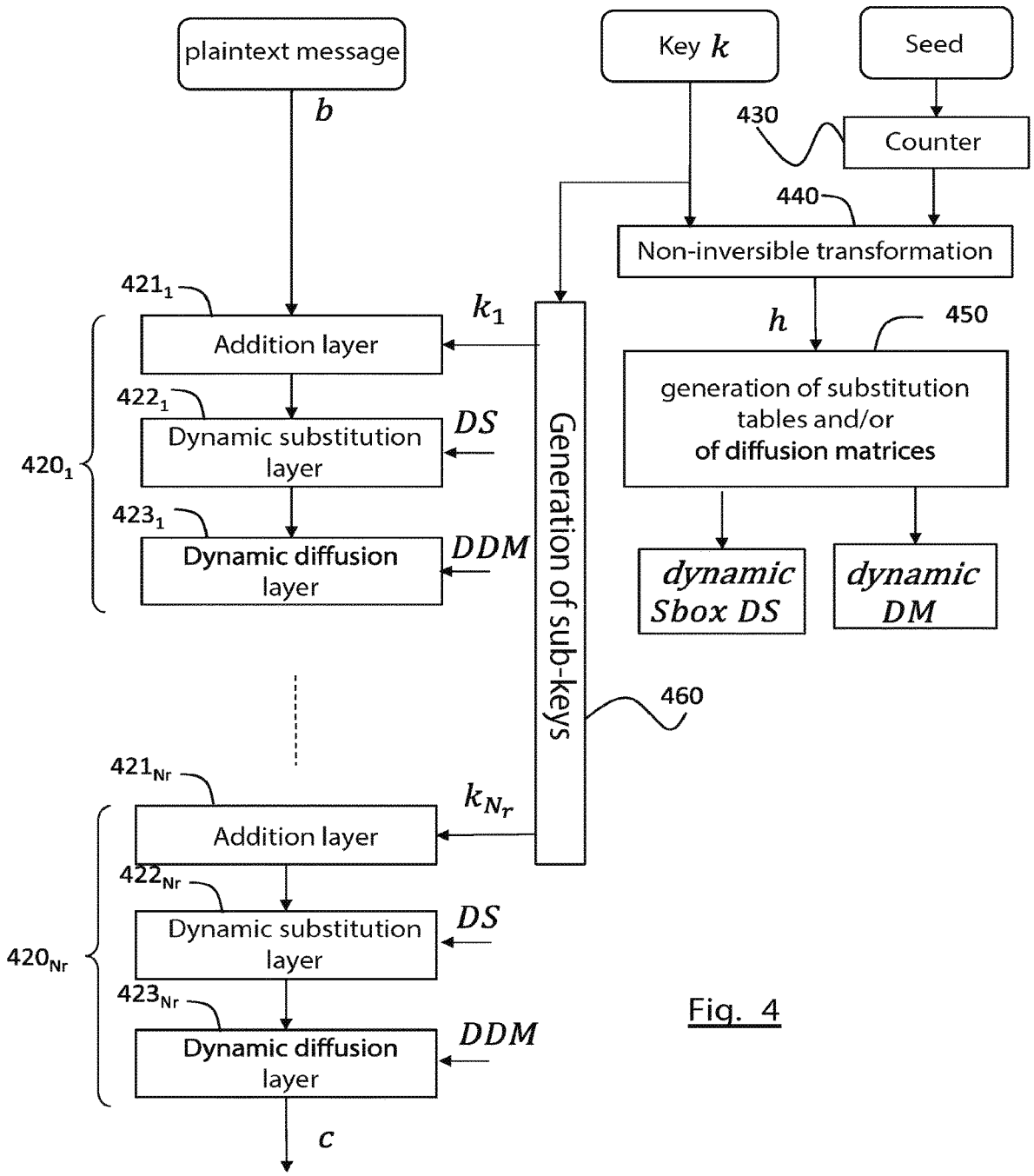
FIG. 4 shows schematically the general structure of a symmetrical encryption method according to a first embodiment of the invention.

More precisely, FIG. 4 shows the general structure of an encryption method according to a first embodiment of the invention.

The encryption method uses a secret key, k, for encrypting a plaintext message or block to be encrypted, b. It moreover initialises a counter 430 from a seed shared between Alice and Bob.

The output of the counter 430 is combined with the key k, the combination thus obtained being the subject of a non-invertible transformation 440 such as a cryptographic hash function, for example the SHA-3 function.

According to a first variant, the combination may be obtained by means of a concatenation of the bits of the key (or of only some of them) and bits of the output word of the counter (or only some of them). The result of the concatenation will be denoted k∥CTR where CTR is the output of the counter.

According to a second variant, the combination can be obtained by means of a sum (exclusive OR) of the key and of the output word of the counter, that is to say k⊕CTR. This sum may also relate to only certain bits of the sum and of the key.

The result of the hashing, or more generally of the non-invertible transformation h, is used as the control parameter.

This control parameter makes it possible to dynamically control the configuration of the substitution and/or diffusion layers. A first part of control parameter can control the substitution layers and a second part of the control parameter can control the diffusion layers.

According to a first variant, the counter 430 is incremented every w block. In other words, if $N_r$ is the number of encryption rounds for a block b, a new control parameter is generated every $Q_r=wN_r$ encryption round. It should be noted that FIG. 4 illustrates the case where w=1, that is to say a generation of control parameters at each plaintext message.

According to a second variant, the counter 430 is incremented every $Q_r$ encryption round with $1 \leq Q_r < N_r$, in other words the counter is incremented at a frequency that is a submultiple of the round frequency (or iteration frequency) in the encryption interval. Furthermore $Q_r$ and $N_r$ are advantageously chosen prime with each other. In a particular case of this second variant, it is possible to choose $Q_r=1$, in other words an updating of the control parameter at each encryption round. It will be understood that this second variant makes it possible to obtain higher resistance to physical attacks than the first variant, at the cost however of greater complexity.

According to a third variant, the counter 430 is incremented every $Q_r > N_r$ encryption rounds with $Q_r$ and $N_r$ prime with each other.

Whatever the variant envisaged, the counting frequency of the counter is known to Alice and Bob.

In general, a control parameter is generated every $Q_r$ encryption rounds. This control parameter serves to configure the substitution layers 421$_i$ and the diffusion layers 422$_i$ of the various encryption rounds. Thus, in the first variant, the control parameter is modified every w block, that is to say $Q_r=wN_r$ encryption rounds. In the second variant, the control parameter is generated at the end of $Q_r$ encryption rounds.

Whatever the variant, a first part of a control parameter can serve as a parameter for the substitution layer 422$_i$, and a second part can serve as a parameter for the diffusion layer 423$_i$. Since changing the set of control parameters leads to a reconfiguration of the substitution and diffusion layers, these can therefore be termed dynamic.

More precisely, the control parameter h makes it possible to generate at 450 a dynamic substitution table (dynamic S-box or DS) from a predetermined static substitution table and a dynamic diffusion matrix (DDM) from a predetermined static diffusion matrix.

It will be understood that the dynamic character of the substitution and diffusion layers makes the encryption method, or more exactly the circuit that implements it, much more resistant to physical attacks, in particular those that attempt find the secret key by correlating physical signals issuing from the circuit with predetermined reference signal. This is because a correlation attack assumes having available stationary physical signals on a time window having a duration of the same order as the time for encrypting several messages. This stationarity is broken by the dynamic nature of the substitution and diffusion layers.

Furthermore, the dynamic configuration of the substitution layers 422$_1$, . . . 422$_{N_r}$ leaves each of them invariant overall. More precisely, the dynamic configuration of a substitution layer leaves each element of the substitution table invariant except for a permutation of its bits. Likewise the dynamic configuration of the diffusion layers 423$_1$, . . . 423$_{N_r}$ leaves each of them invariant overall. In other words, the dynamic configuration of a diffusion layer does not affect all the elements of the diffusion matrix but only the distribution of these elements in the matrix. Thus the configuration does not modify the structure of the encryption method so that it keeps its resistance to the conventional cryptanalysis techniques.

Upstream of the substitution layers 422$_1$, . . . 422$_{N_r}$ and diffusion layers 423$_1$, . . . 423$_{N_r}$, addition layers with encryption-round sub-keys are provided at 421$_1$, 421$_{N_r}$ in order to effect a masking. The sub-keys are generated from the key k and an encryption round counter in a manner known per se, for example according to the method used in the AES algorithm.

The decryption of the message encrypted by means of the encryption method of FIG. 4 is carried out using the secret key and the same seed as those used during encryption. A counter is initialised by the seed and incremented with the same counting frequency as the one used during encryption. The order of the addition, substitution and diffusion layers is inverted. The round sub-keys are generated in the same way as for the encryption and the addition layers carry out the addition with these sub-keys. The substitution layers use substitution tables that are the inverse of those used during encryption, the permutation of each element of the table also being the inverse of the one used for encryption. Likewise the diffusion layers use a diffusion matrix that has undergone a permutation that is the inverse of that undergone during the encryption.

Figure 5:
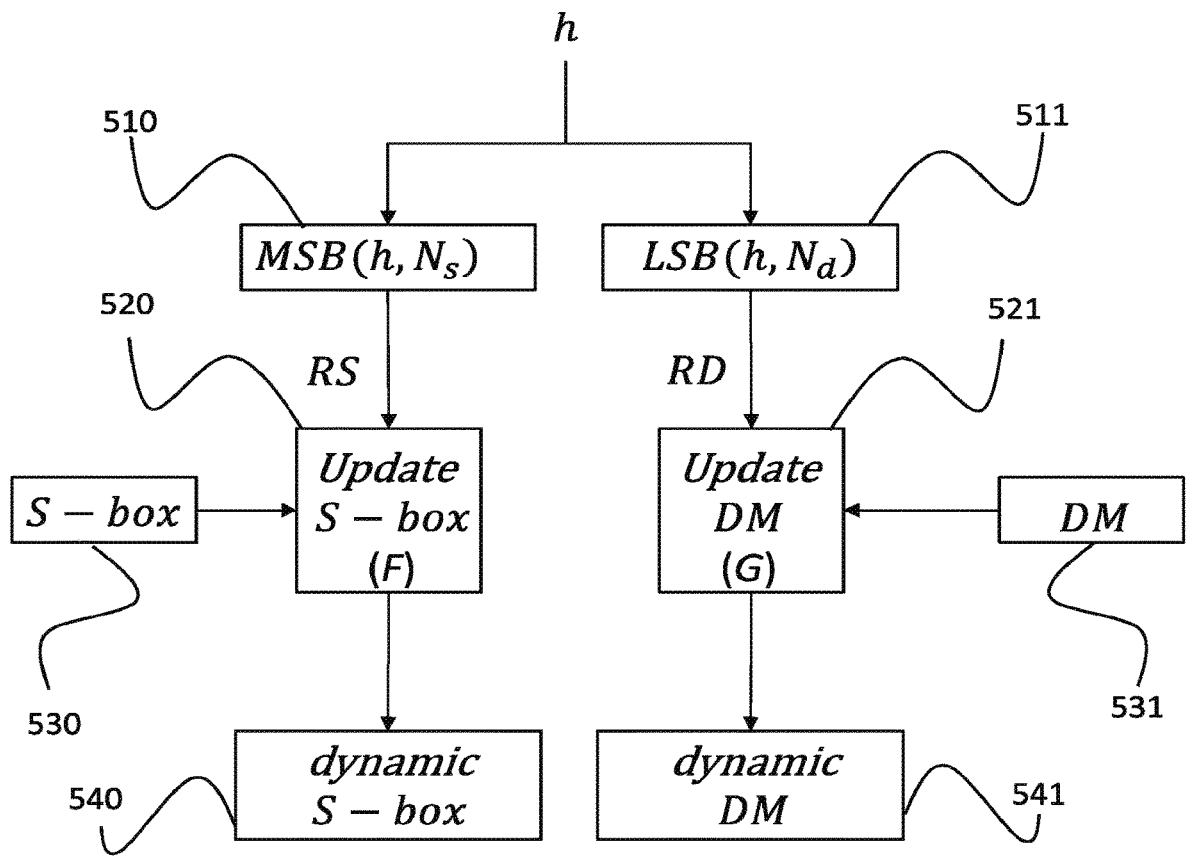
FIG. 5 shows schematically an example embodiment of a dynamic substitution layer and diffusion layer for the encryption method of FIG. 4.

FIG. 5 shows an example embodiment of a dynamic substitution layer and diffusion layer for the encryption method of FIG. 4.

The control parameter relating to the encryption round is designated h.

The control parameter h is divided into a first part RS that serves to configure the substitution layer, and a second part RD that serves to configure the diffusion layer. For example, the first part RS is formed from the m most significant bits (MSB) of h and the second part RD is formed from the n least significant bits (LSB) of h.

At 520 a permutation is carried out on the bits of each byte of a predetermined (static) substitution table 530 in order to obtain a dynamic substitution table 540 dependent on the first part RS.

In a similar manner, at 521 a permutation is carried out on the rows and columns of a static predetermined diffusion matrix 531 in order to obtain a dynamic diffusion matrix 541 dependent on the second part RD.

Figure 6:
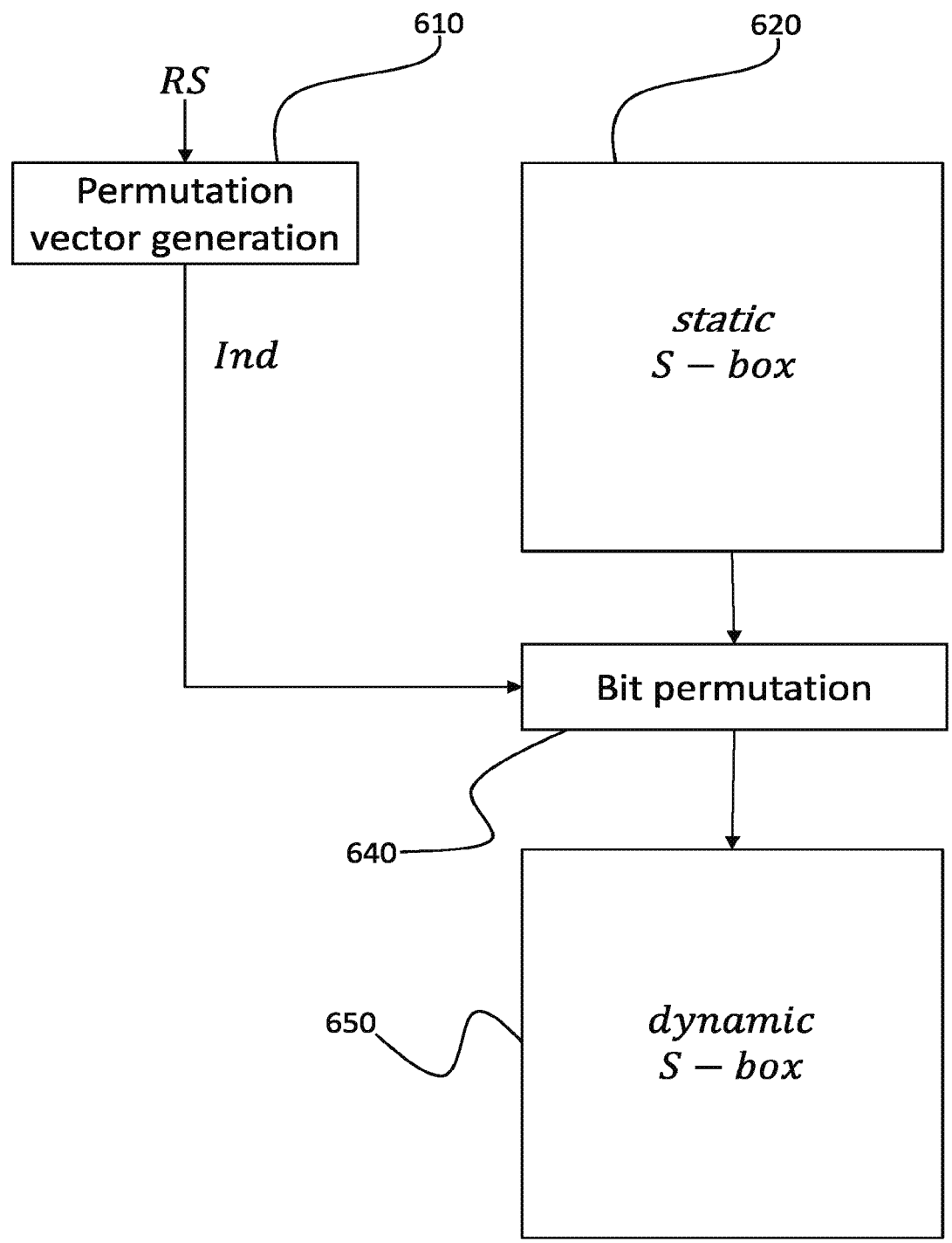
FIG. 6 shows schematically an example of generation of a dynamic substitution table in FIG. 5.

FIG. 6 shows an example embodiment of the module 540 in FIG. 5.

The first part of the sub-key RS is divided into $N_s$ blocks each of $q_s$ bits, that is to say $N_s=m/q_s$ with $q_s=\log_2(L)$ where L is the static substitution table length, in other words the number of elements in the table. Each element of the table is coded in $q_s$ bits.

The word RS is used for generating, at 610, a permutation vector Ind of size $q_s$, the elements of the vector Ind being the integers $1, \ldots, q_s$, each value being shown only once. The method for generating the permutation vector is presented below in relation to FIG. 9.

The permutation vector Ind indicates the permutations to be made on the bits of each element of the substitution table. Each element of the substitution table 620 is thus replaced at 640 by an element the bits of which have been permuted.

The result is a dynamic substitution table 650, the elements of which are dependent on the first part RS of the sub-key.

It is important to note that the permutation on each element of the static substitution table preserves the resistance of the encryption method to conventional cryptanalysis methods. In particular, immunity against linear and differential attacks is unchanged since the linear probability (LP) and differential probability (DP) are preserved.

Figures 7A, 7B:
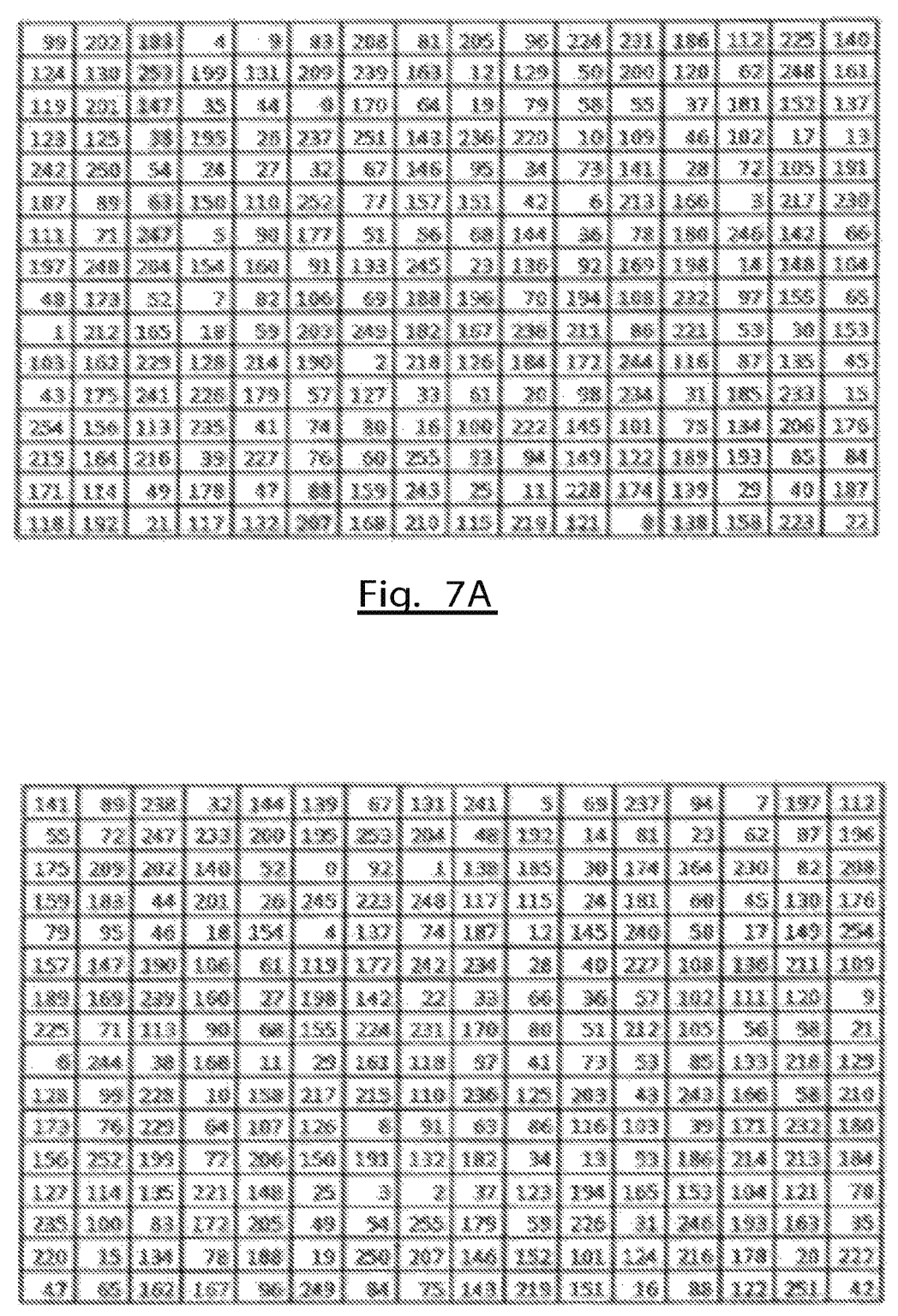

FIG. 7A shows the substitution table of a conventional AES encryption method. This is of length L=256 and consists of 16 rows by 16 columns, each element of the table belonging to $GF(2^8)$.

This table is used to substitute an outgoing byte for an incoming byte in the following manner. The incoming byte is divided into two half-bytes, one half-byte giving the row number and a second half-byte giving the column number. The outgoing byte is given by the element stored in the table at the row and column thus determined.

For example, if the incoming byte is $(A2)_{hex}$, the outgoing byte supplied by the substitution table is $(E5)_{hex}$=229.

FIG. 7B shows the result of a permutation operation on the substitution table in FIG. 7A.

The permutation of the bits of an element, here a byte, of the substitution table is defined by a permutation vector Ind=$(p_7\ p_6\ p_5\ p_4\ p_3\ p_2\ p_1\ p_0)$. This permutation applies in an identical fashion to all elements of the table so that the bijectivity of the substitution table is preserved.

An element $b_7b_6b_5b_4b_3b_2b_1b_0$ of the table is transformed by the previous permutation into the element $b_{p7}b_{p6}b_{p5}b_{p4}b_{p3}b_{p2}b_{p1}b_{p0}$. In the example illustrated the permutation vector is Ind=(0 7 2 3 1 5 4 6). Thus an element $b_7b_6b_5b_4b_3b_2b_1b_0$ of the substitution table is transformed into the element $b_0b_7b_2b_3b_1b_5b_4b_6$.

Figure 8:
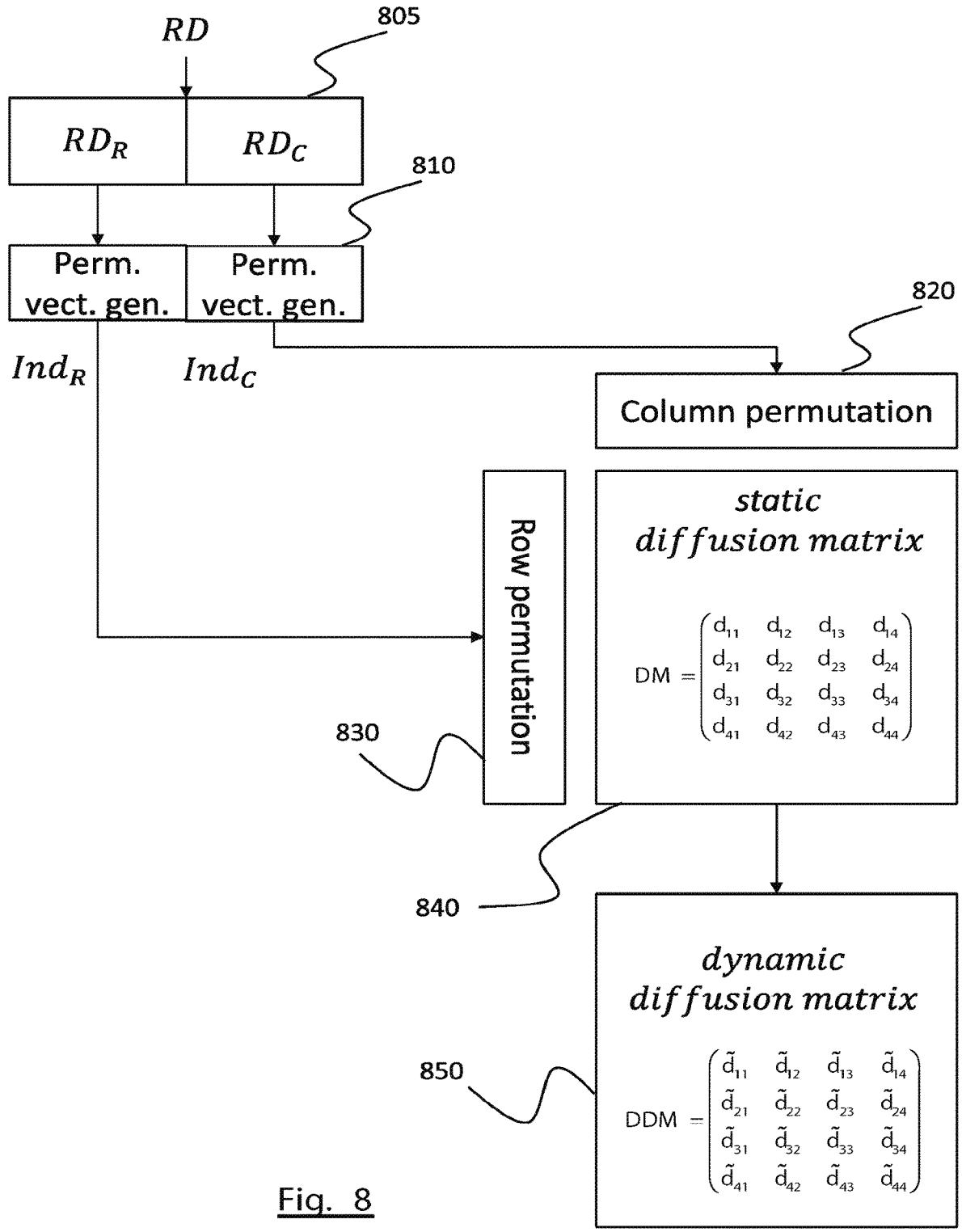
FIG. 8 shows a schematically an example of the generation of a dynamic diffusion matrix in FIG. 5.

FIG. 8 shows an example embodiment of the module 541 of FIG. 5.

The second part RD of the sub-key is divided into blocks each of $q_d$ bits, that is to say $N_d=n/q_d$ blocks where $q_d=\log_2(Q)$ is chosen according to the size Q×Q of a predetermined (static) diffusion matrix. Next, at 805, a first word consisting of $N_d/2$ blocks (for example the first $N_d/2$ blocks of RD), denoted $RD_R$, and a second word consisting of $N_d/2$ blocks (for example the last $N_d/2$ blocks of RD), denoted $RD_C$ are formed.

The first word $RD_R$ (and respectively the second word $RD_C$) is used at 815 to generate a row permutation vector $Ind_R$ (and respectively a column permutation vector $Ind_C$). The vectors $Ind_R$ and $Ind_C$ are of size Q and have values 1, . . . , Q, of as their elements, each value being represented only once.

The permutation of the rows of the diffusion matrix DM is carried at 830 according to the row permutation vector $Ind_R$, and the column permutation is carried out at 820 according to the common permutation vector $Ind_C$.

For example, if Q=4 and the vectors $Ind_R$=(α β χ δ) and $Ind_C$=(ε φ φ γ), the diffusion matrix:

$$DM = \begin{pmatrix} d_{11} & d_{12} & d_{13} & d_{14} \\ d_{21} & d_{22} & d_{23} & d_{24} \\ d_{31} & d_{32} & d_{33} & d_{34} \\ d_{41} & d_{43} & d_{43} & d_{44} \end{pmatrix}$$

is transformed into the matrix:

$$DDM = \begin{pmatrix} d_{\alpha\varepsilon} & d_{\alpha\phi} & d_{\alpha\varphi} & d_{\alpha\gamma} \\ d_{\beta\varepsilon} & d_{\beta\phi} & d_{\beta\varphi} & d_{\beta\gamma} \\ d_{\chi\varepsilon} & d_{\chi\phi} & d_{\chi\varphi} & d_{\chi\gamma} \\ d_{\delta\varepsilon} & d_{\delta\phi} & d_{\chi\varphi} & d_{\chi\gamma} \end{pmatrix}$$

In general terms, the result of this permutation is a dynamic diffusion matrix DDM at 850, dependent on the second part RD of the sub-key.

This dynamic diffusion matrix is used conventionally to mix a block of Q bytes as an input. For example, if it is assumed that Q=4 and the vector of the input bytes is denoted a=$(a_1\ a_2\ a_3\ a_4)^T$, the vector of the bytes obtained by diffusion at the output, $a_d$, is none other than:

$$a_d = \begin{pmatrix} \tilde{d}_{11} & \tilde{d}_{12} & \tilde{d}_{13} & \tilde{d}_{14} \\ \tilde{d}_{21} & \tilde{d}_{22} & \tilde{d}_{23} & \tilde{d}_{24} \\ \tilde{d}_{31} & \tilde{d}_{32} & \tilde{d}_{33} & \tilde{d}_{34} \\ \tilde{d}_{41} & \tilde{d}_{43} & \tilde{d}_{43} & \tilde{d}_{44} \end{pmatrix} \begin{pmatrix} a_1 \\ a_2 \\ a_3 \\ a_4 \end{pmatrix}$$

where the elements $\tilde{d}_{pq}$ of the matrix DDM are bytes. The addition operations in the matrix multiplication are carried out in $GF(2^8)$, that is to say by simple XORs bit by bit. In carrying out the multiplications, for each byte the polynomial representing this byte is considered, that is to say for a byte $b_0b_1 \ldots b_7$ where $b_0$ is the LSB and $b_7$ is the MSB, the polynomial $b_7X^7+b_6X^6+\ldots+b_1X+b_0$. The multiplications between two bytes are carried out by multiplying the corresponding representative polynomials and calculating the remainder of the division of the polynomials thus obtained by a generator polynomial P(X) of $GF(2^8)$, for example the one used in the AES encryption method, namely $P(X)=X^8+X^4+X^3+X+1$.

It is important to note that the permutation between the elements of the diffusion matrix preserves the number of linear diffusion branches and consequently the resistance of the encryption method to conventional cryptanalysis methods.

Furthermore, as with the substitution layer, the dynamic configuration of the diffusion layer makes the latter substantially more resistant to physical attacks.

Figure 9:
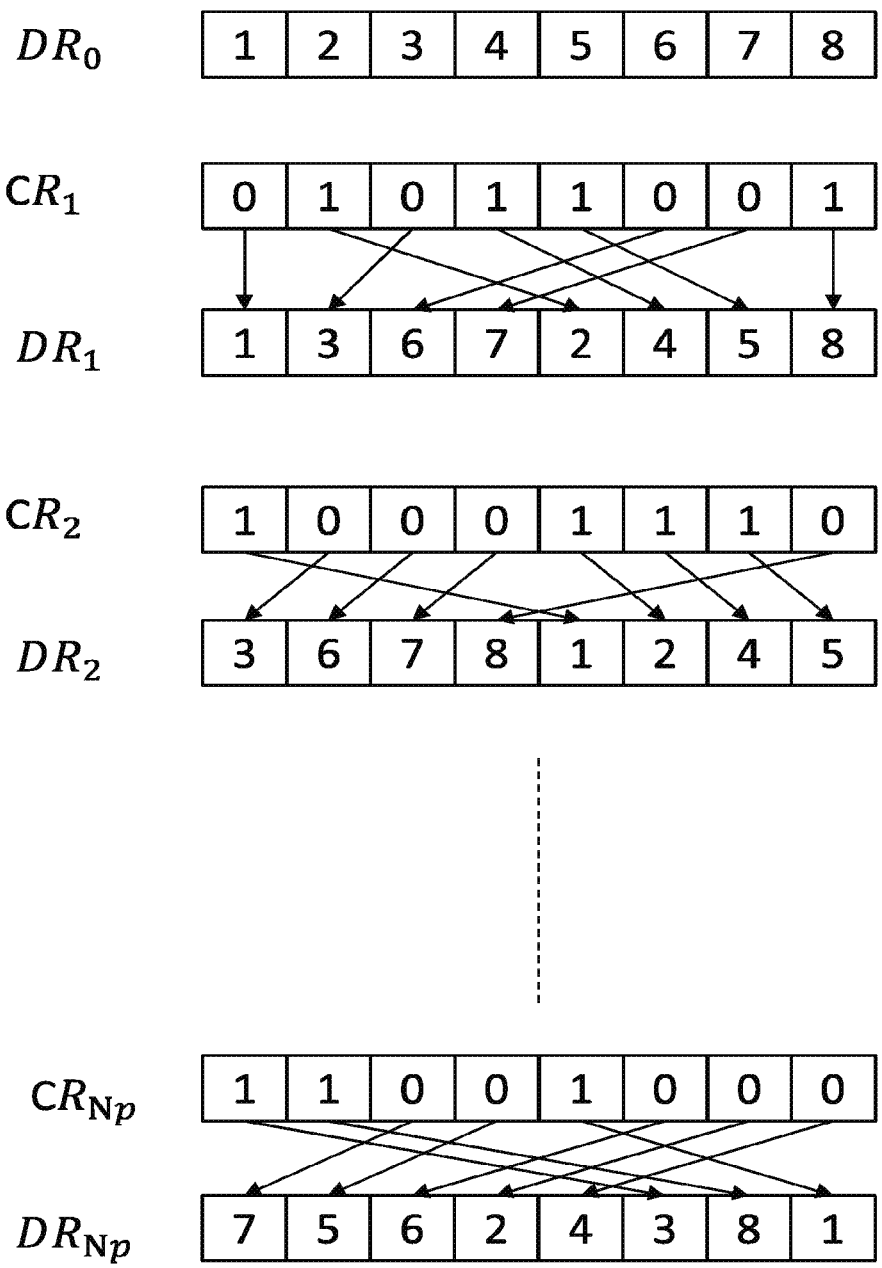
FIG. 9 shows schematically a permutation vector generation module in FIGS. 6 and 8.

FIG. 9 illustrates a method for generating a permutation vector in FIGS. 6 and 8. More precisely, this method makes it possible to generate the permutation vector Ind in the module 610 of FIG. 6 and the permutation vectors $Ind_R$ and $Ind_C$ in the module 810 of FIG. 8. It should be stated however that the permutation vector Ind operates on the bits of an elements of the substitution matrix and is of size $q_s$, whereas the vectors $Ind_R$ and $Ind_C$ operate respectively on the static diffusion matrix and are therefore of size $q_d$=Q.

The vector Ind is generated from the various blocks of the first part RS of the control parameter, each block consisting of $q_s$ bits. The number of blocks $N_s$ is assumed to satisfy $N_s \geq N_p$ where $N_p$ is a predetermined number of permutations.

The vector $Ind_R$ (and respectively $Ind_C$) is generated from the $N_d/2$ blocks of $RD_R$ (and respectively $RD_C$), each block consisting of $q_d$ bits. The number of blocks $N_d/2$ is assumed to satisfy $N_d/2 \geq N_p$.

In the remainder of the description, for the requirements of a homogeneous presentation, $Ind_\pi$ would be the permutation vector (this being able to represent either Ind, $Ind_R$, or $Ind_C$), $q_\pi$ would be the size of the vector, $R_1, \ldots R_{N_r}$ would be the first $N_r$ blocks of the starting word R (this being able to represent respectively RS, $RD_R$ and $RD_C$).

The words $R_1, \ldots R_{Nr}$ are loaded respectively in the successive $N_r$ control registers $CR_1, \ldots, CR_{Nr}$, each being of size $q_\pi$.

Moreover, there are $N_p+1$ data registers $DR_0, \ldots, DR_{Np}$. The first data register $DR_0$ is initialised with the word $1, \ldots, q_\pi$, corresponding to the case of a permutation equal to identity. A data register $DR_p$ is obtained by a so-called GRP permutation operation using the data $D_{p-1}$ contained in the data register $DR_{p-1}$ and the control word $R_{p-1}$ contained in the control register $CR_p$. A description of the GRP permutation method will be found in particular in the article by Lee et al. entitled "On permutation operations in cipher design" published in Proc. of ITCC 2004 on Information Technology: Coding and Computing, vol. 2, pp. 569-577, 5-7 Apr. 2014. This method will be understood easily in the example illustrated in FIG. 9.

It is assumed in this figure that $q_\pi=8$.

The first data register is initialised to $D_0=12345678$, as indicated above.

The control register $CR_1$ is initialised with the word $R_1=01011001$.

The elements of $DR_0$ are respectively controlled by the bits of $CR_1$. More precisely, the elements of $DR_0$ corresponding to a bit value equal to 0 are stored at the left-hand end of $DR_1$ and the elements of $DR_0$ corresponding to a bit value equal to 1 are stored at the right-hand end of $DR_1$. Thus the data D1=13672458

The process of permutation of the data under the control of the control registers continues as far as $p=N_p$.

It will thus be understood that, at each encryption round, there are available, from the control parameters, permutation vectors Ind, $Ind_R$, or $Ind_C$ making it possible to permutate each element of the static substitution table as well as the rows and columns of the static diffusion matrix.

According to a variant, each step of the method for generating a permutation vector is duplicated as follows: each data item $D_p$ is controlled firstly by the control word $R_{p+1}$ and then the resulting data item is controlled secondly by the control word $\bar{R}_{p+1}$ (the logic inverse of $R_{p+1}$). In this way the number of control operations is doubled in FIG. 9 in order to obtain increased randomisation.

Figure 10A:
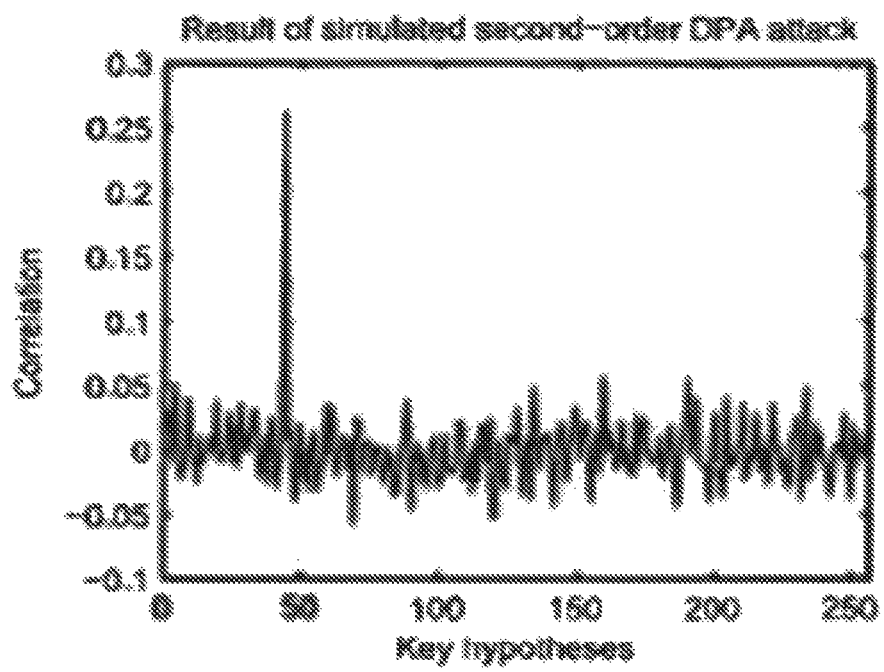
FIGS. 10A and 10B show correlation curves of a second-order DPA attack, respectively for a conventional AES encryption method and an encryption method according an embodiment of the invention.
Figure 10B:
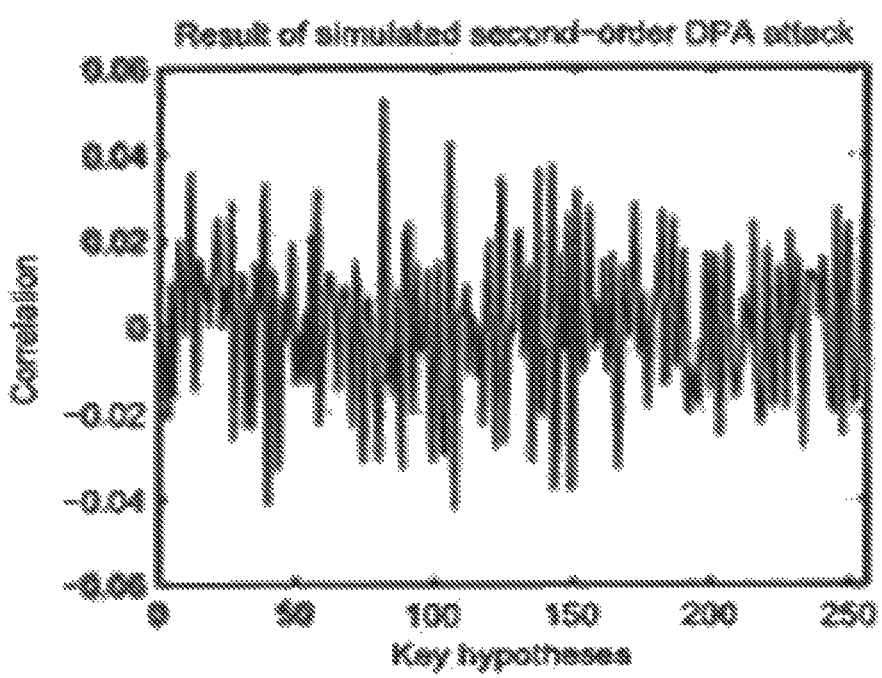

FIGS. 10A and 10B illustrate respectively the resistance to an attack by differential power analysis (DPA) for a conventional AES encryption method and an encryption method according to an embodiment of the invention.

An attack by DPA on an encryption circuit assumes producing a hypothetical consumption model M of this circuit according to the secret key. A correlation is then made between the power consumption T, as measured over time, and a variable V(k) representing the consumption of the encryption circuit, as predicted from the model M.

The various secret-key hypotheses are tested one after another and, for each secret-key hypothesis k, the Pearson coefficient is calculated between T and V(k), that is to say $$\rho_{TV(k)} = \frac{\sigma_{TV(k)}}{\sigma_T \sigma_{V(k)}}$$

where $\sigma_{TV(k)}$ is the covariance between T and V(k), $\sigma_T$ is the variance of T $\sigma_{V(k)}$ is the variance of V(k).

The secret key $\hat{k}$ is then determined as the one maximising the value of the Pearson coefficient, that is to say:

$$\hat{k} = \underset{k}{\operatorname{argmax}}(\rho_{TV(k)})$$

FIGS. 10A and 10B show the Pearson coefficient according to the secret-key hypothesis k, respectively for the conventional AES encryption method and the encryption method according to a method that is the embodiment of the invention. The secret-key value (43) being the same in both cases. It will be noted that the curve in FIG. 10A shows a clear correlation peak for this key value whereas that of FIG. 10B makes estimating the secret key impossible. The greatest peak corresponds to an erroneous secret-key value (80).

Although the present invention has been illustrated in the context of a block encryption, it can also be applied in the context of a stream cipher. Unlike block encryption methods, stream encryption methods encrypt each bit of the plaintext message individually by adding to it the bit of a keystream. Generally synchronous stream encryption methods in which the keystream is independent of the message to be encrypted and asynchronous encryption methods in which the keystream is generated from the message to be encrypted by means of a feedback are distinguished.

Figure 11:
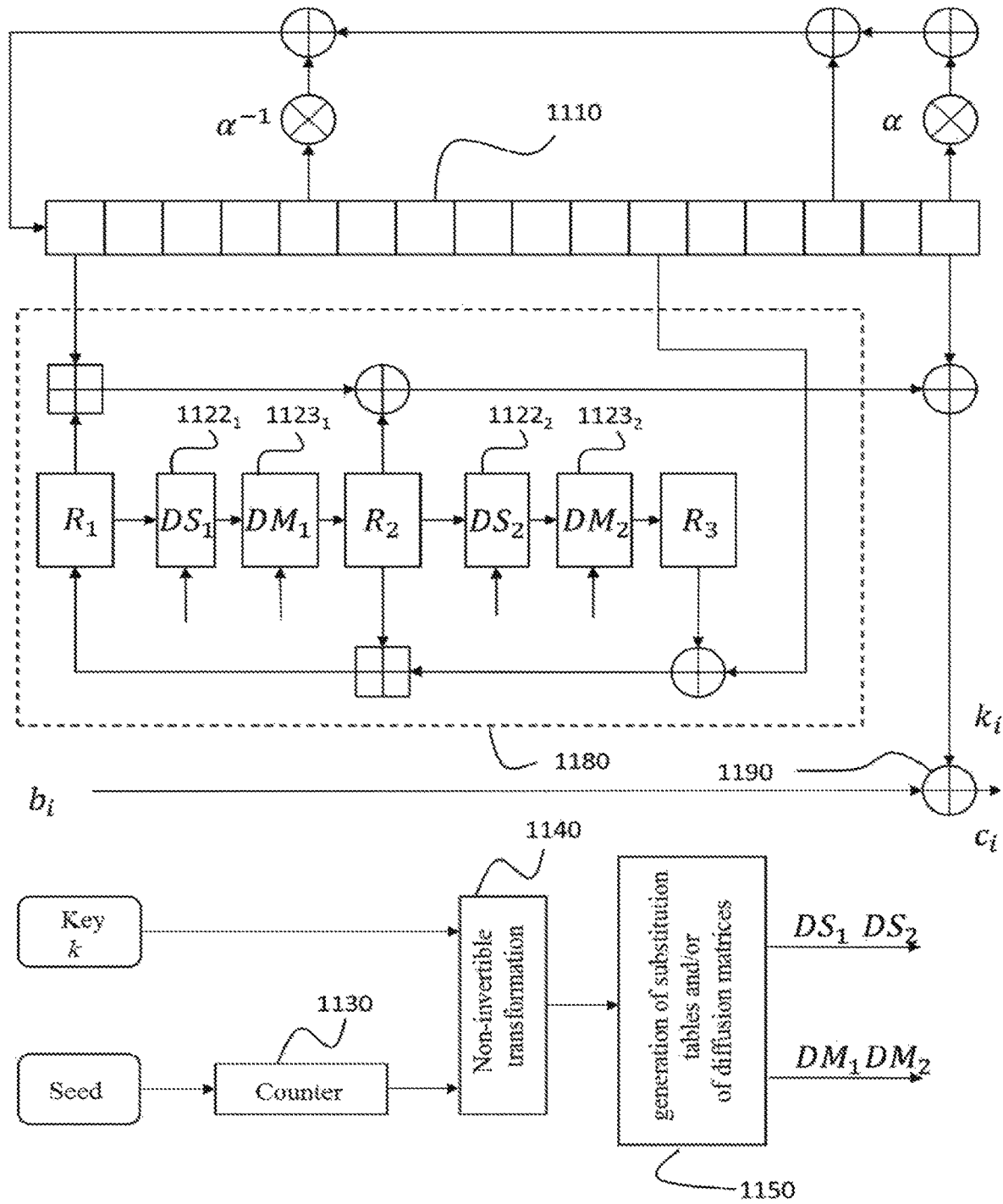
FIG. 11 shows an example of an encryption method according to a second embodiment of the invention.

FIG. 11 shows an example of stream encryption according to a second embodiment of the invention.

The encryption method is here implemented by means of a linear feedback shift register (LFSR) 1110, and a finite state machine (FSM) 1180.

The shift register is initialised by means of an initial value (here a 16-bit word) giving the content of the shift register. Several takes from the shift register feed the finite machine.

The finite state machine comprises a plurality of registers $R_1$, $R_2$, $R_3$, (here of size 32 bits) intended to store intermediate results. The operations ⊕ ⊞ signify respectively addition operations in GF(2) and GF($2^{32}$).

The word contained in the register $R_1$ is subjected to a first substitution operation $1121_1$ and a first diffusion operation $1122_1$. The word contained in the register $R_2$ is subjected to a second substitution operation $1121_2$ and a second diffusion operation $1122_2$. Each substitution operation uses a corresponding substitution table and each diffusion operation uses a corresponding diffusion matrix.

An output of the finite state machine and the output of the shift register are added in order to generate the keystream. The bits of the keystream $k_i$ are added to the bits of the message to be encrypted $b_i$ at 1190 in order to give bits of the encrypted message $c_i$.

This type of stream encryption is used by the SNOW 3G standardised algorithm.

However, as in the case of the first embodiment, the substitution and diffusion layers are here configured dynamically by means of a control parameter h. This control parameter is generated by effecting a non-invertible transformation 1140, for example a hash operation, on the combination of a secret key and an output of a counter, 1130, as described previously.

The counter is incremented at least once between two plaintext messages.

The control parameter dynamically configures the substitution $1122_1$, $1122_2$ and diffusion $1123_1$, $1123_2$ layers.

More precisely, the dynamic configuration of each substitution layer is carried out by effecting an identical permutation on the bits of each element of a static substitution table, the permutation vector being obtained from a first part of the control parameters.

The configuration of each diffusion layer is carried out by effecting a permutation of the elements of the diffusion matrix, the permutation of the elements of the matrix being obtained from a second part of the control parameter.

The decryption of a message encrypted by means of the encryption method illustrated in FIG. 11 is done in an identical manner to the encryption. In other words, the generation of the keystream is strictly identical to that of the encryption, with in particular the same structure of the shift register, the finite-state machine and the control of the substitution and diffusion layers.

The addition of the encrypted message to the corresponding bits of the keystream makes it possible to restore the plaintext message.

The invention claimed is:

1. A method for the symmetrical encryption of plaintext messages with a secret key using at least one of (a) at least one substitution layer using a substitution table and (b) at least one diffusion layer using a diffusion matrix, the method comprising:
   initializing a counter with a seed;
   incrementing said counter at least once between the encryption of two successive plaintext messages;
   performing a non-invertible transformation on a combination of said secret key with an output word from said counter in order to generate a control parameter;
   configuring, using the control parameter, the at least one of (a) the at least one substitution layer and (b) the at least one diffusion layer, the configuration of the at least one substitution layer being controlled by a first part of the control parameter to produce an identical permutation of the bits of each element of the substitution table specific to the first part of the control parameter when the at least one substitution layer is configured with the first part of the control parameter, and the configuration of the at least one diffusion layer being controlled by a second part of the control parameter to produce a permutation of the elements of the diffusion matrix specific to the second part of the control parameter when the at least one diffusion layer is configured with the second part of the control parameter; and
   encrypting the plaintext messages using the at least one of (1) the substitution table specific to the first part of the control parameter when the at least one substitution layer is configured with the first part of the control parameter and (2) the diffusion matrix specific to the second part of the control parameter when the at least one diffusion layer is configured with the second part of the control parameter to produce encrypted messages.

2. The method according to claim 1, wherein the encrypting the plaintext messages comprises performing a block encryption, each block being subject to a plurality of encryption rounds ($N_r$), each encryption round using a respective substitution layer of the at least one substitution layer and a respective diffusion layer of the at least one diffusion layer, wherein the respective substitution layer and the respective diffusion layer of each encryption round are configured using at least a part of the control parameter.

3. The method according to claim 2, wherein the at least one substitution layer is configured with the first part of the control parameter and the at least one diffusion layer is configured with the second part of the control parameter.

4. The method according to claim 2, when the at least one diffusion layer is configured with the second part of the control parameter in the configuring step, the configuring step comprising:
   generating a first permutation vector (Ind) from the first part of the control parameter,
   permuting bits of each element of a static substitution table with said first permutation vector in order to generate a dynamic substitution table, dependent on the first part of said control parameter.

5. The method according to claim 4, wherein generating the first permutation vector comprises:
   dividing the first part of the control parameter into a first plurality of blocks ($D_p$), each block being stored in a respective control register ($CR_p$), and
   performing a plurality of permutation steps ($N_p$), each permutation step comprising controlling a respective input data register ($DR_{p-1}$) by control registers ($CR_p$) in order to store elements of the respective input data register in an subsequent output data register ($DR_p$), said controlling comprising storing first elements of the input data register at a first end of the output data register if the first elements in the control register have a first logic value, and storing the first elements at a second end of the output data register if the first elements in the control register have a second logic value.

6. The method according to claim 4, further comprising:
   generating, from the second part of the control parameter, a second row permutation vector and a second column permutation vector, wherein rows and columns of a diffusion matrix are permutated respectively according to said second row and column permutation vectors, in order to generate a dynamic diffusion matrix dependent on said control parameter.

7. The method according to claim 6, wherein the second row and column permutation vectors are respectively generated by dividing the second part of the control parameter into first and second words with the same size, the first and second words being each divided into a second plurality of blocks.

8. The method according to claim 2, wherein the counter is incremented every $Q_r=wN_r$ encryption rounds, where w is the number of blocks in the plaintext message.

9. The method according to claim 2, wherein the counter is incremented every $Q_r<N_r$ encryption rounds and $Q_r,N_r$, are integers prime with each other.

10. The method according to claim 1, wherein the combination of the secret key with the output word of the counter is a concatenation.

11. The method according to claim 1, wherein the non-invertible transformation comprises a hash operation.

12. The method according to claim 1, wherein said encrypting comprises:
   performing a stream encryption, wherein each bit of the plaintext message is added to a corresponding bit of a keystream, the keystream being generated by a shift register coupled to a finite state machine, the finite state machine comprising the at least one of (a) the at least one substitution layer using the substitution table and (b) the at least one diffusion layer using the diffusion matrix.

13. The method for symmetrical encryption according to claim 1, wherein the steps thereof are performed by a computer.

14. A non-transitory computer readable medium for storing computer instructions for controlling a computer processor to perform the steps of claim 1.

15. A decryption method for the decryption of a message encrypted with the method according to claim 1, the decryption method comprising:
   initializing a second counter with the seed used in the initializing step;
   incrementing said counter using a same frequency as the incrementing during encryption;
   performing the non-invertible transformation on the combination of the secret key and the output word of said counter used for the encryption;
   generating the control parameter of the encryption from the non-invertible transformation performed during decryption;
   configuring at least one of (a) at least one decryption-side substitution layer and (b) at least one decryption-side diffusion layer configured by the generated control parameter, the configuration of the at least one decryption-side substation layer being controlled by a first part of the generated control parameter to produce an inverse permutation of the bits of each element of the at least one decryption-side substitution table with respect to the permutation used for the encryption when the at least one substitution layer is configured with the first part of the control parameter, and the configuration of the at least one decryption-side diffusion layer being controlled by a second part of the generated control parameter to produce an inverse permutation of the elements of the diffusion layer with respect to the permutation used for encryption when the at least one diffusion layer is configured with the second part of the control parameter; and
   decrypting the encrypted messages to recover the plaintext messages.

16. The decryption method according to claim 15, wherein, during encryption, a stream encryption is performed wherein each bit of the plaintext message is added to a corresponding bit of a keystream, the keystream being generated by a shift register coupled to a finite state machine, the finite state machine comprising the at least one of (a) the at least one substitution layer using the substitution table and (b) the at least one diffusion layer using the diffusion matrix, wherein, during decoding, each bit of the encrypted message is added to a corresponding bit of the keystream as generated during encryption, the keystream being generated during decoding using a second shift register coupled to a second finite state machine, the second finite state machine comprising the at least one of (a) the at least one decryption-side substitution layer using the substitution table used for encryption and (b) the at least one decryption-side diffusion layer using the diffusion matrix used for encryption.

* * * * *